Dec. 31, 1935.    H. D. COLE    2,026,160
MILK BOTTLE HOLDER
Filed May 15, 1935    3 Sheets-Sheet 1
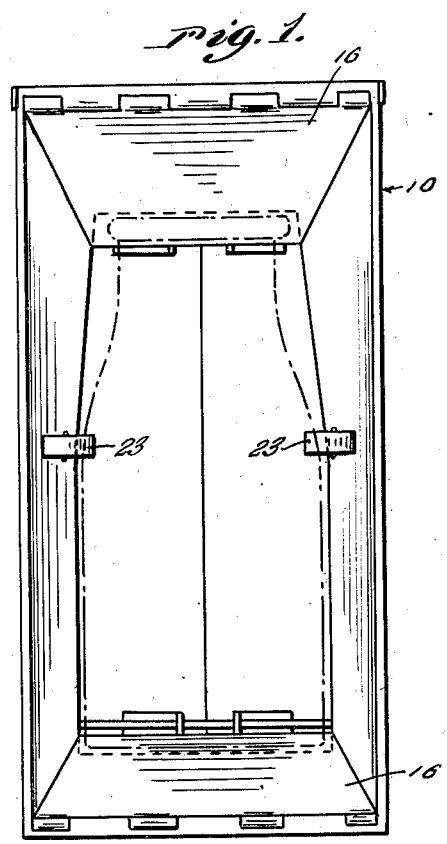
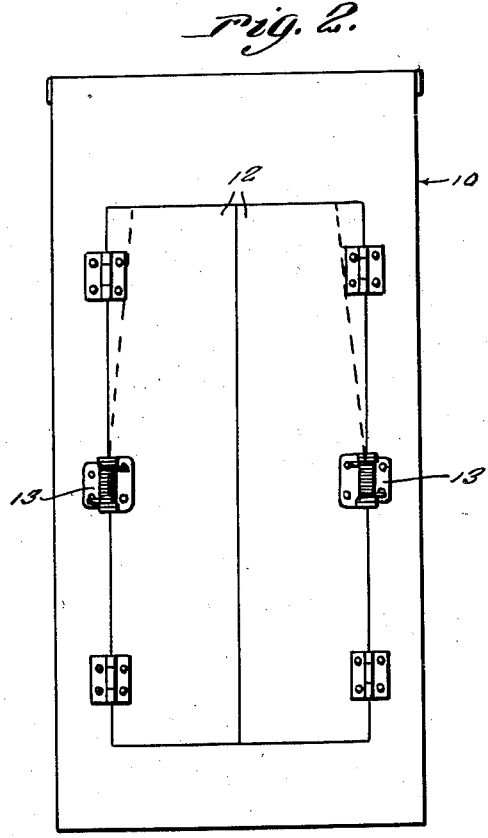
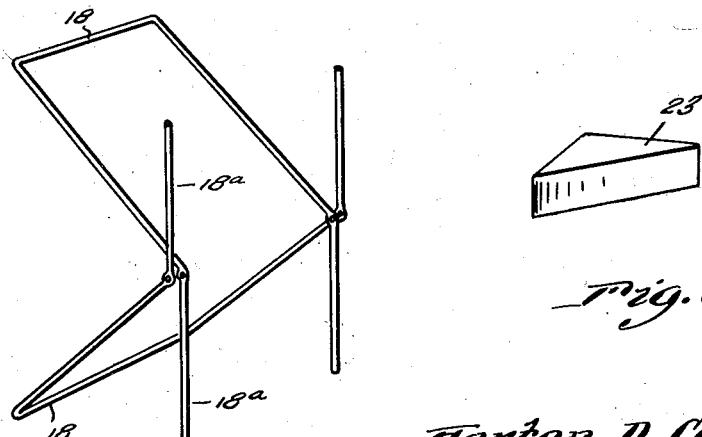
Inventor
Horton D. Cole
By Clarence A. O'Brien
Attorney Dec. 31, 1935.    H. D. COLE    2,026,160
MILK BOTTLE HOLDER
Filed May 15, 1935    3 Sheets-Sheet 2
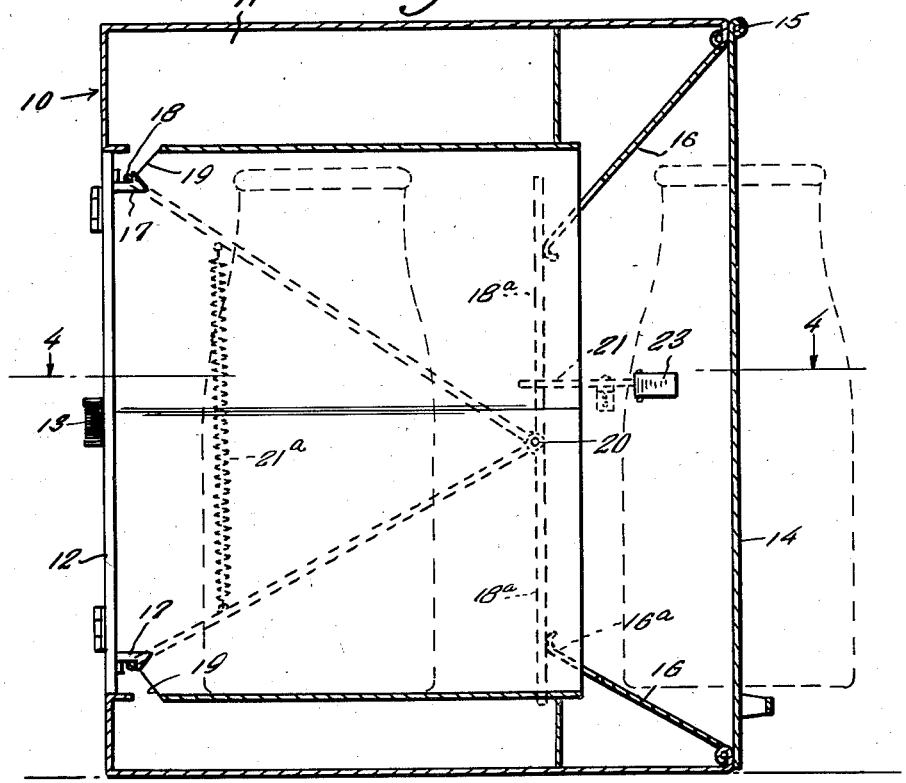
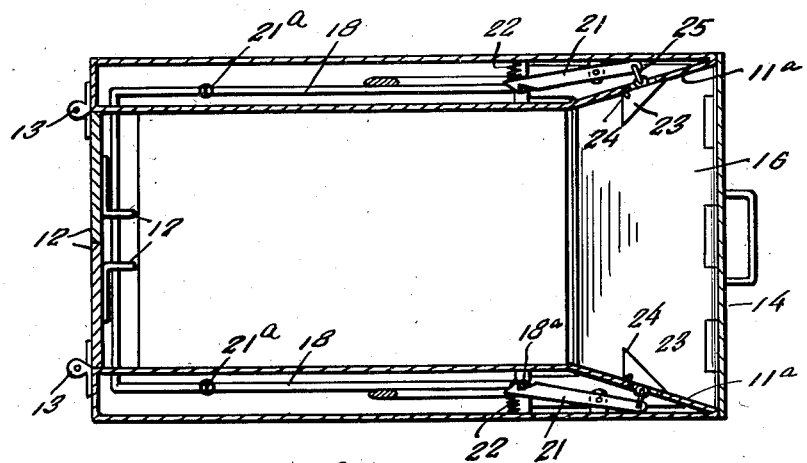
Inventor
Horton D. Cole
By Clarence A. O'Brien
Attorney Dec. 31, 1935.    H. D. COLE    2,026,160
MILK BOTTLE HOLDER
Filed May 15, 1935    3 Sheets-Sheet 3

Inventor
Horton D. Cole

By Clarence A. O'Brien and
Hyman Berman  Attorneys

Patented Dec. 31, 1935

2,026,160

UNITED STATES PATENT OFFICE 2,026,160

MILK BOTTLE HOLDER

Horton D. Cole, Scotia, N. Y.

Application May 15, 1935, Serial No. 21,651

5 Claims. (Cl. 232—41)

This invention relates to a novel construction of collection and deposit receptacles and more particularly to a receptacle particularly adapted for use as a milk bottle holder.

An object of the present invention is to provide a milk bottle holder of such a construction, combination and arrangement of parts that in order to remove a bottle therefrom, a second bottle must be placed in the container, the device thus proving a savings to dairy concerns since it will tend to the return of empty bottles.

A further object of the invention is to provide a milk bottle holder of the character above mentioned characterized by simplicity and economy of construction and efficiency of operation.

The invention together with its objects and advantages will be best understood from a study of the following description taken in connection with the accompanying drawings wherein:

Figure 1 is an elevational view of one end of the holder with the door at said end removed.

Figure 2 is an elevational view of the opposite end of the holder.

Figure 3 is a vertical sectional view through the bottle holder.

Figure 4 is a horizontal sectional view taken substantially on the line 4—4 of Figure 3.

Figure 5 is a perspective view of a pair of keeper elements.

Figure 6 is a perspective view of what may be termed a cam lug.

Figure 7:
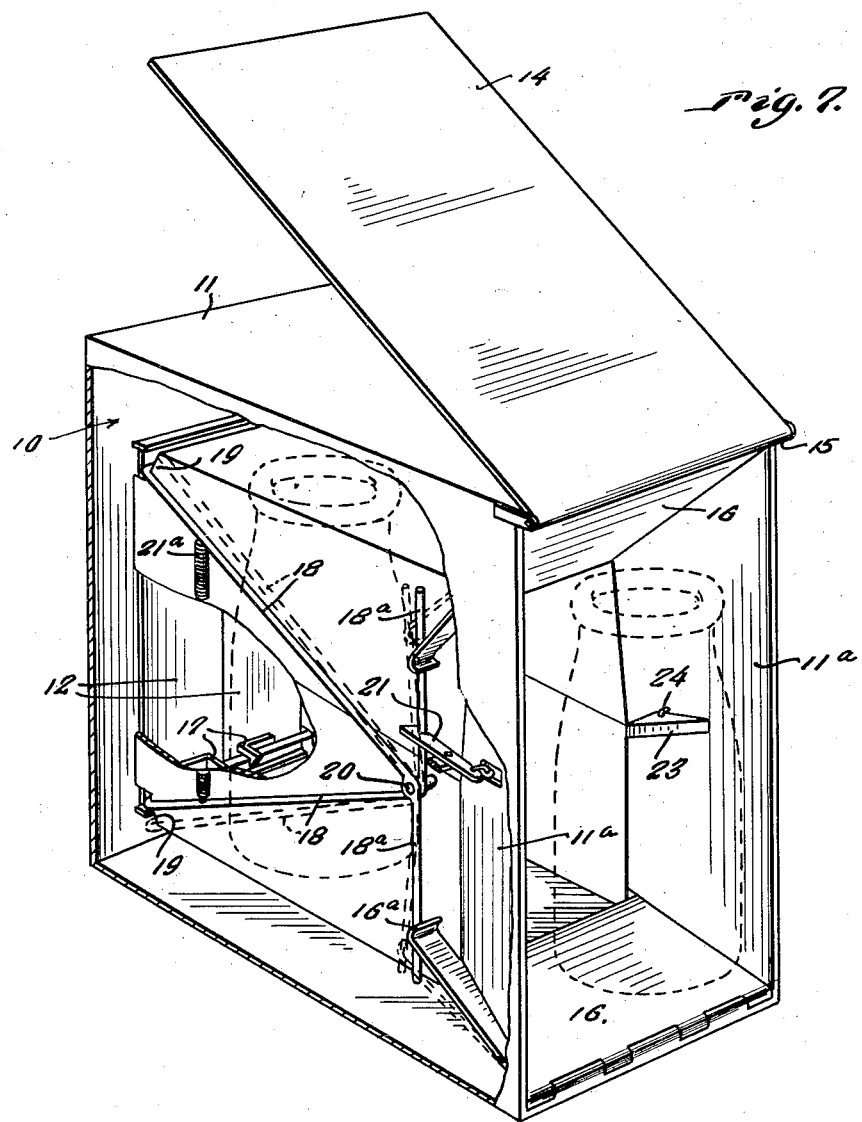
Figure 7 is a perspective view, with parts broken away, to show the internal structure and operation of the device and with a milk bottle contained in the device and another milk bottle being inserted therein for clearly illustrating the operation of the invention.

In accordance with the present invention and referring to the drawings by reference numerals it will be seen that in the preferred embodiment thereof I provide a housing or receptacle 10 preferably formed of sheet metal and having bottom, top and side walls hollow as indicated generally at 11. At one end of the housing or receptacle, there is provided a pair of outwardly swinging doors 12 equipped with spring hinges 13 that serve to normally swing the doors to closed position.

At the opposite side of the housing there is provided a vertically swingable door 14 hinged to the top of the housing or receptacle as at 15.

Also, at the last named end of the housing there are hinged at the top and bottom thereof vertically and reversely swinging upper and lower metallic plates or flaps 16 which at their inner edges are suitably notched or otherwise formed to provide arms or extensions 16a operating in the hollows of the opposed side walls of the housing or receptacle as best shown in Figure 4.

The doors 12 on their inner sides are provided with upper and lower latches 17. Cooperable with the latches 17 are keeper bars or members 18.

As shown in Figure 5, each of the members 18 is preferably formed of wire bent into a substantial U with the sides of the U operating in the hollows of the side walls and the closed ends 10 of the U operating in suitable notches 19 provided at opposite sides of the housing or receptacle and opening in to the hollows 11 at the top and bottom of the receptacle.

The sides of the members 18 inwardly from the open ends thereof are angularly disposed, and the sides of the members 18 at the angles are provided to receive pivot pins whereby these members 18 are pivoted in the hollows of the side walls of the housing or receptacle as indicated generally at 20. Thus it will be seen that the ends of the upwardly swinging member 18 extend downwardly while the ends of the downwardly disposed member 18 normally extend upwardly, and that said ends of the sides of the members 18 are normally engaged with the projections 16a of the flaps 16 as best indicated in Figure 3.

The sides of the members 18 are connected by springs 21a which urge these members into engagement with the latches 17 as also shown in Figure 3.

For releasably retaining the keeper members 18 in the position shown in Figure 3, and in engagement with the latches 17 there are provided in the hollows 11 of the side walls of the housing or receptacle, pivoted latches 21 that engage with the ends 18a of the members 18 as best shown in Figure 4, and are normally urged into engagement with said ends 18a through the medium of suitably arranged springs 22.

For releasing the latches 21 there are provided on the diverging inner faces 11a of the side walls of the receptacle or casing 10 substantially triangular blocks or cam lugs 23. The lugs 23 are pivoted to the faces 11a of the side walls as at 24 and have suitable link connections 25 with the latches 21 as shown in Figure 4.

The operation and utility of the device will be apparent from the following.

With a bottle, for example, an empty bottle arranged within the receptacle or housing 10, the parts are in the position shown in the drawings, in which position the doors 12 are secured in locked closed position. To remove this bottle a second bottle must be passed into the receptacle.

This second bottle is passed into the receptacle through the end thereof equipped with the door 14. It will be apparent that the second bottle as it is being introduced in the receptacle through the end just mentioned will laterally engage the lugs 23 causing the latter to swing toward one another. This swinging movement of the lugs 23 will cause a swinging movement of the latches 21 to a position releasing the ends 18a of the keeper members 18.

The top and bottom of the bottle will engage the flaps 16 causing the same to swing inwardly and upon release of the ends 18a of the members 18 the swinging movement of the flaps 16 is transmitted to the members 18 causing the latter to swing in reverse directions away from one another and out of engagement with the latches 17. Thus as this second bottle moves into the receptacle it will force the first bottle therein from the receptacle through the doors 12. Obviously, when the first bottle has been thus forced from the receptacle and the second bottle is in final position within the receptacle, the parts will immediately return to the position shown for securing the second bottle within the receptacle. Thus it will been seen that with a receptacle of this character, the house-wife will be required to replace the full bottle of milk within the receptacle with an empty bottle and thus the delivery man will be able to collect an empty bottle for every full bottle of milk.

Having thus described the invention, what is claimed as new is:

1. A bottle holder comprising a door, latch means for normally holding the same closed, other latch means engageable with the first latch means for releasably retaining the first latch means in door securing position, and means arranged in the path of a bottle introduced into the receptacle and adapted to be actuated by impact of the bottle therewith for releasing the second named latch means and for positively moving the first named latch means to a door releasing position.

2. A bottle receiving receptacle comprising a door, latch means for normally holding the same closed, second latch means engageable with the first latch means for releasably retaining the first latch means in door securing position, means controlled by the passage of a bottle into the receptacle, to operate the second latch means to release the first latch means, and other means controlled by the passage of the bottle into the receptacle for moving the first latch means to a door releasing position upon a releasing of the first latch means.

3. A bottle holder comprising a receptacle, a door associated therewith for closing the same, spaced latch elements on the inner side of the door, pivoted keeper means mounted within the receptacle and swingable in reverse directions to engage said latches for releasably securing the door locked from inside the receptacle, pivoted latch means engageable with said keeper means for releasably securing the keeper means engaged with the first latches, and means for tripping the pivoted latches incidental to an insertion of a bottle into the receptacle.

4. A bottle holder comprising a receptacle, a door associated therewith for closing the same, spaced latch elements on the inner side of the door, pivoted keeper mean mounted within the receptacle and swingable in reverse directions to engage said latches for releasably securing the door locked from inside the receptacle, pivoted latch means engageable with said keeper means for releasably securing the keeper means engaged with the first latches, means for tripping the pivoted latches incidental to an insertion of a bottle into the receptacle, and other means for moving the keeper means to a releasing position incidental to a tripping of the pivoted latches.

5. A bottle holder including a receptacle, a door associated therewith and equipped on its inner side with latches, keeper members pivotally mounted within the receptacle and engageable with the latches for normally securing the door closed, pivoted elements mounted within the receptacle and engageable by a bottle fastened to the receptacle, said pivoted elements engaging said keeper members for moving the same out of engagement with the latches incidental to the placing of a bottle within the receptacle, pivoted latches engageable with the keeper elements for releasably retaining the latter engaged with the latches on the door, pivoted lugs arranged in operative position to said pivoted elements to be engaged by a bottle incidental to a placing of a bottle within the receptacle, and means operatively connecting said lugs with the pivoted latches for tripping the latter to release said keeper members in the manner and for the purpose specified.

HORTON D. COLE.